(12) United States Patent
Si et al.

(10) Patent No.: US 9,175,984 B2
(45) Date of Patent: Nov. 3, 2015

(54) MECHANISM OF INTERIOR PERMANENT MAGNET MACHINE INITIAL POSITION DETECTION

(71) Applicant: Caterpillar Inc., Peoria, IL (US)

(72) Inventors: Baojun Si, Dunlap, IL (US); Osama Alkhouli, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 221 days.

(21) Appl. No.: 13/724,367

(22) Filed: Dec. 21, 2012

(65) Prior Publication Data

US 2014/0176129 A1  Jun. 26, 2014

(51) Int. Cl.
*G01B 7/30* (2006.01)
*G01D 5/245* (2006.01)

(52) U.S. Cl.
CPC ........................................ *G01D 5/245* (2013.01)

(58) Field of Classification Search
USPC .................................................... 324/207.25
See application file for complete search history.

(56) References Cited

U.S. PATENT DOCUMENTS

| | | | | |
|---|---|---|---|---|
| 5,982,117 | A * | 11/1999 | Taylor et al. | 318/400.01 |
| 6,369,541 | B1 * | 4/2002 | Albert | 318/560 |
| 6,717,314 | B2 * | 4/2004 | Horst et al. | 310/156.43 |
| 7,233,123 | B2 | 6/2007 | Koczara et al. | |
| 7,592,761 | B2 * | 9/2009 | MacKay | 318/254.1 |
| 7,885,785 | B1 * | 2/2011 | Pekarek et al. | 702/151 |
| 8,054,030 | B2 | 11/2011 | Son et al. | |
| 2009/0128074 | A1 | 5/2009 | Hu | |
| 2010/0090632 | A1 * | 4/2010 | Maekawa | 318/400.33 |
| 2010/0164310 | A1 | 7/2010 | Dames et al. | |
| 2011/0308071 | A1 | 12/2011 | Baumann et al. | |
| 2014/0035502 | A1 * | 2/2014 | Wang et al. | 318/400.37 |
| 2014/0117901 | A1 * | 5/2014 | Gerdes et al. | 318/400.33 |

FOREIGN PATENT DOCUMENTS

EP  2437391 A1  4/2012

OTHER PUBLICATIONS

Richmond, Mutual and Self-Inductance, Rochester Institute of Technology, p. 1-11, http://spiff.ritedu/classes/phys213/lectu res/henry/henry_long.html.*
Miller, T.J.E., Popescu, M., Cossar, C., McGilp, M.I., and Walker, J.A. (2003) Calculating the interior permanent-magnet motor. In: Electric Machines and Drives Conference., Madison, W.I., 1-4 Jun. 2003., pp. 1181-1187.*
Texas Instruments, Pmsm Overview Motor Control - Permanent Magnet Synchronous Motors (Pmsm), 2015, p. 1.*
Rahman et al., Advances in Interior Permanent Magnet (Ipm) Motor Drives, IEEE Pes 2005 Conference in Africa, Durban, S. Africa, 11-15, Jul. 2005.*
Jahns, et al., Interior permanent magnet synchronous motors for adjustable speed drives, IEEE Trans on Indus. App., V. 1A-22, N. 4, 1986, p. 738-741.*

* cited by examiner

*Primary Examiner* — Thomas F Valone
(74) *Attorney, Agent, or Firm* — Miller, Matthias & Hull LLP

(57) ABSTRACT

A system for determining an initial rotor position of an interior permanent magnet (IPM) machine having a rotor and a stator is provided. The system may include a drive circuit in operative and electrical communication with each phase of the IPM machine, and a controller in electrical communication with the drive circuit. The controller may be configured to engage the drive circuit to selectively apply a voltage signal to each phase of the stator of the IPM machine, detect a current signal through each phase corresponding to the applied voltage signal, and calculate the initial rotor position based on a least squares analysis between at least the voltage signal, the current signal and a predefined inductance of the IPM machine.

20 Claims, 4 Drawing Sheets

MECHANISM OF INTERIOR PERMANENT MAGNET MACHINE INITIAL POSITION DETECTION

TECHNICAL FIELD

The present disclosure generally relates to interior permanent magnet (IPM) machines, and more particularly, to systems and methods for detecting the initial rotor position of IPM machines.

BACKGROUND

Permanent magnet machines or motors are commonly used in the industry to convert electrical or electromagnetic energy into rotational torque for a variety of different applications, including machine tools, traction motors, industrial work machines, stationary drive machines, mobile work vehicles, hybrid electric vehicles, and the like. One type of permanent magnet machine with growing interest in the industry is the interior permanent magnet (IPM) machine. Because of its relatively consistent power over a broad speed range and its enclosed-magnet design, IPM motors have shown to be ideal for many applications, especially for traction motors, machine tools, and the like.

As with typical induction motors, the IPM motor provides a multi-phase stator and a rotor disposed within the stator. The typical IPM motor is controlled by switching circuitry, or the like, which sources phase current to the different phases of the stator in succession, which in turn creates a changing electromagnetic field within the stator. Rotational torque is generated at the output shaft of the IPM motor as the permanent magnets disposed within the rotor attempt to align themselves according to the changing electromagnetic fields.

While different schemes can be used to drive an IPM motor, the typical drive scheme sources current to each phase of the stator in reference to feedback provided by a rotor speed sensor. Moreover, the rotor speed sensor serves to detect the rotational speed of the rotor relative to the stator, and provide a check and balance for the drive system as it operates the IPM motor. Although the rotor speed sensor can sufficiently monitor rotor speed, it is unable to track the absolute position of the rotor. Accordingly, typical drive schemes also incorporate means for determining the initial rotor position as a critical first step.

To determine the initial rotor position of an IPM machine, many conventional systems measure the voltage exhibited by the stator immediately after the rotor finishes spinning and comes to a rest. More specifically, the last point of zero-crossing of the rotor is assessed based on the stator voltage, and the associated angular position of the rotor is identified in relation to at least one phase of the stator. However, such initial position assessments are often inaccurate, and the inaccuracies are further compounded by the rotor speed sensor as it has no interim means to correct or compensate for such inaccuracies. The present disclosure is directed at addressing one or more of the deficiencies set forth above.

SUMMARY OF THE DISCLOSURE

In one aspect of the present disclosure, a system for determining an initial rotor position of an interior permanent magnet (IPM) machine having a rotor and a stator is provided. The system may include a drive circuit in operative and electrical communication with each phase of the IPM machine, and a controller in electrical communication with the drive circuit. The controller may be configured to engage the drive circuit to selectively apply a voltage signal to each phase of the stator of the IPM machine, detect a current signal through each phase corresponding to the applied voltage signal, and calculate the initial rotor position based on a least squares analysis between at least the voltage signal, the current signal and a predefined inductance of the IPM machine.

In another aspect of the disclosure, a method of determining an initial rotor position of an IPM machine having a rotor and a stator is provided. The method may apply a voltage signal to each phase of the stator of the IPM machine; determine a current signal through each phase corresponding to the applied voltage; and calculate the initial rotor position based on a least squares analysis between at least an amplitude and a phase of each voltage signal, and an amplitude and a phase of each current signal.

In yet another aspect of the disclosure, a method of automatically determining an initial rotor position during startup of an IPM machine having a rotor and a stator is provided. The method may receive a sensor signal from a rotor speed sensor indicative of a speed of the rotor relative to the stator to confirm zero rotor speed; apply a sinusoidal voltage signal to each phase of the stator of the IPM machine where each voltage signal has a substantially high frequency and a substantially low amplitude; detect a current signal through each phase corresponding to the applied voltage signal; determine a relationship between the voltage signal, the current signal and the initial rotor position based on a least squares analysis and a predefined inductance of the IPM machine; and calculate the initial rotor position based on the relationship.

DETAILED DESCRIPTION

Reference will now be made in detail to specific embodiments or features, examples of which are illustrated in the accompanying drawings. Generally, corresponding reference numbers will be used throughout the drawings to refer to the same or corresponding parts.

Figure 1:
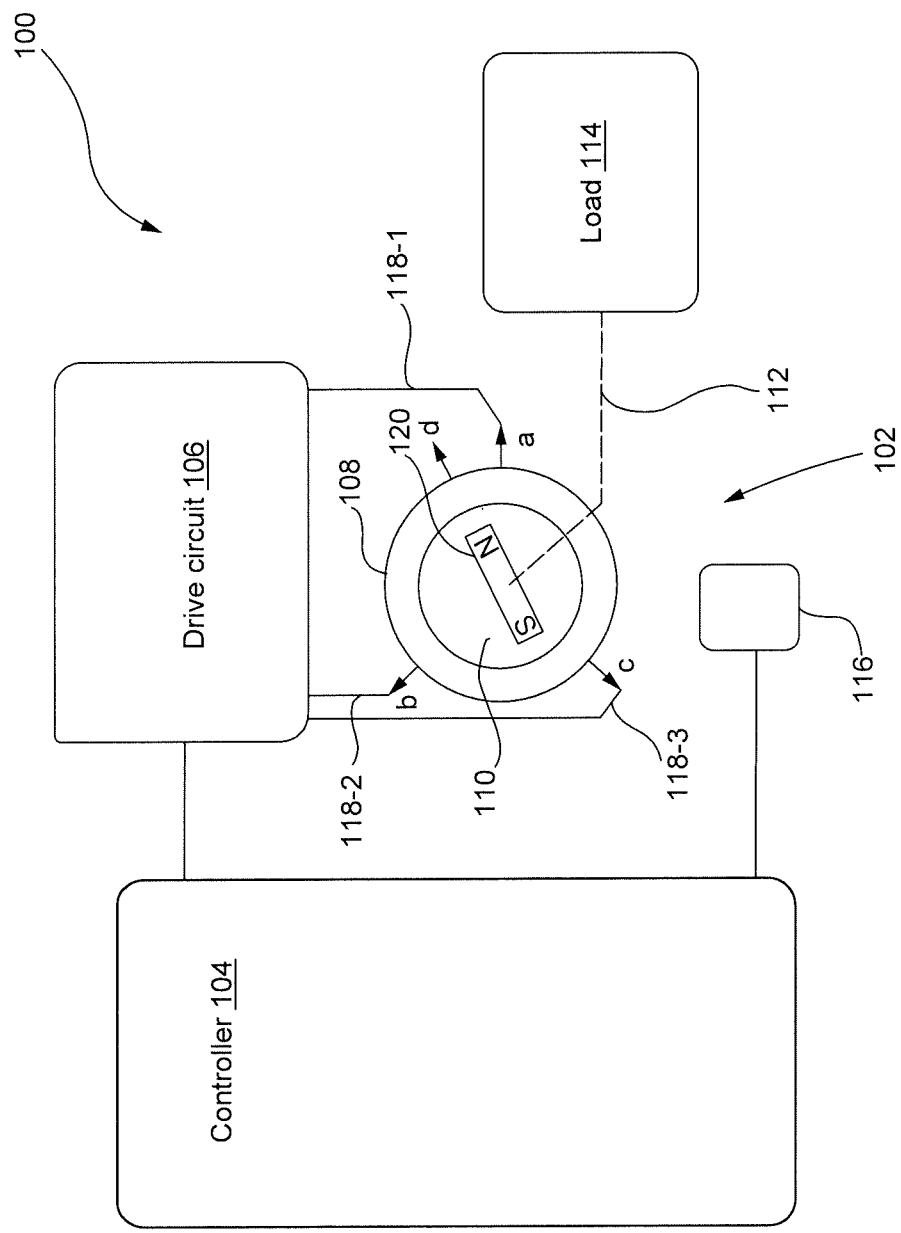
FIG. 1 is a schematic view of one exemplary embodiment of an electric drive system incorporating an initial rotor position detection system.

FIG. 1 schematically illustrates one exemplary electric drive system 100 that may be employed in conjunction with industrial work machines, stationary drive machines, mobile work vehicles, hybrid electric vehicles, machine tools, mining machines, and construction machine, and the like. As shown, the electric drive 100 may employ an interior permanent magnet (IPM) machine 102, or any other suitable and comparable machine, that may be electrically operated to produce rotational torque. More particularly, the electric drive system 100 may include at least one controller 104 which manages operation of the IPM machine 102 through control of at least one drive circuit 106 electrically coupled to a stator 108 of the IPM machine 102. Based on the desired application, a rotor 110 rotatably disposed within the stator 108 may be caused to generate a rotational torque to be communicated through an output shaft 112 to one or more connected loads 114. The loads 114 may include any one or more of a traction device for causing movement of an associated machine, a machine or work tool, and the like. The controller 104 may additional employ a speed sensor 116, such as a magnetic sensor, a Hall-effect sensor, an optical sensor, an optical encoder mechanism, or the like, to detect and monitor the rotational speed of the rotor 110 relative to the stator 108.

Figure 2:
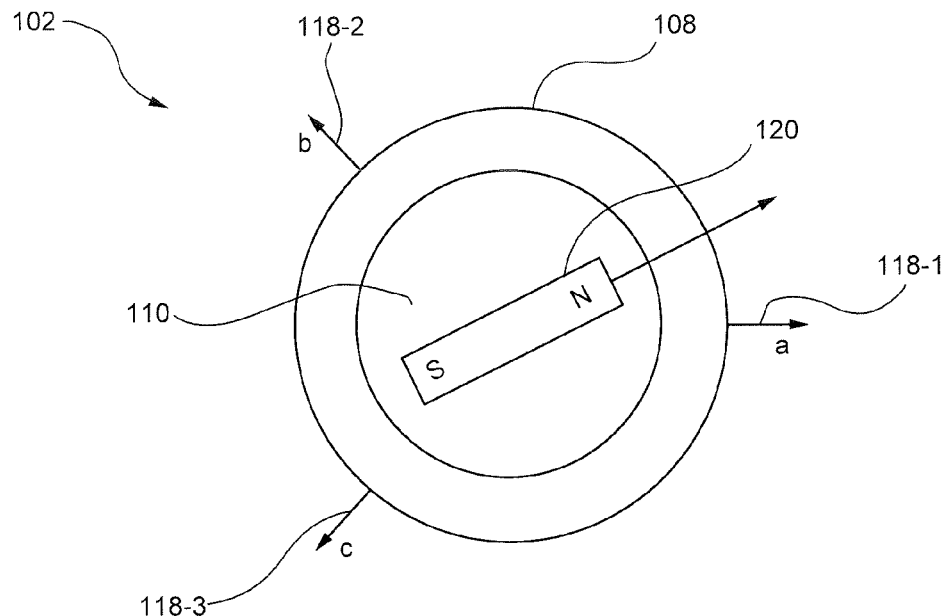
FIG. 2 is a cross-sectional view of a three-phase interior permanent magnet (IPM) machine.
Figure 3:
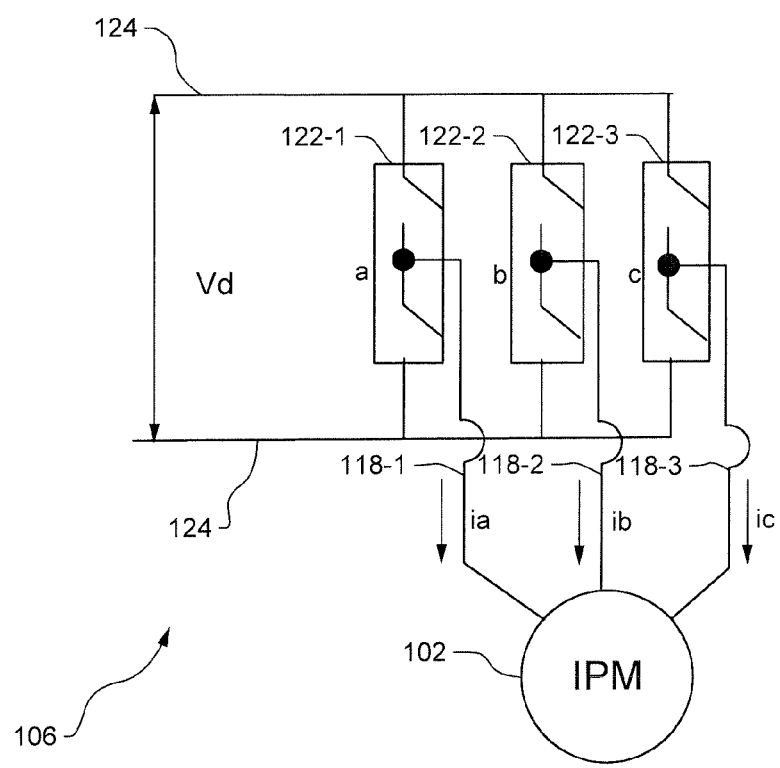
FIG. 3 is a diagrammatic view of a drive circuit for controlling an IPM machine.

As further disclosed in FIG. 2, the stator 108 of the IPM machine 102 may include a plurality of phases 118 which are electrically engageable in succession to generate magnetic flux. The rotor 110 may comprise one or more permanent magnets 120 internally disposed therein which are configured to interact with the magnetic flux to cause an alignment between the rotor 110 and the electromagnetic field, and generate rotational torque at the output shaft 112. Control of electric current that is sourced to each phase 118 of the stator 108 may be provided in part by, for example, the drive circuit 106 of FIG. 3. As shown, the drive circuit 106 may generally include an arrangement of switches 122 configured to selectively place each phase 118 of the stator 108 in electrical communication with a voltage source via a common bus 124, or the like. While the embodiments of the IPM machines 102 disclosed in FIGS. 1-3 may be configured with a three-phase stator 108 and a single permanent magnet 120 disposed within the rotor 110, other modifications and variations will be apparent to those skilled in the art without departing from the scope of the appended claims.

As illustrated in FIG. 1, selective and electronic control of the switches 122 of the drive circuit 106 may be managed by the controller 104 and at least partially based on sensor signal input received from the one or more speed sensors 116 associated therewith. However, to better improve the responsiveness and efficiency of the IPM machine 102, the controller 104 may additionally be configured to determine the initial position of the rotor 110 at stand-still and prior to generating torque within the IPM machine 102. In particular, the controller 104 may be configured to operate according to a predetermined algorithm or set of instructions for determining an initial position of the rotor 110 relative to the stator 108 of the IPM machine 102, for instance, as part of a startup routine of the electric drive system 100. Such an algorithm or set of instructions may be preprogrammed or incorporated into a memory disposed within the controller 104 or otherwise associated with the controller 104 as is commonly used in the art. Furthermore, the controller 104 may be implemented using one or more of a processor, a microprocessor, a microcontroller, a digital signal processor (DSP), a field-programmable gate array (FPGA), an electronic control module (ECM), an electronic control unit (ECU), or any other suitable means for electronically controlling the IPM machine 102.

Figure 4:
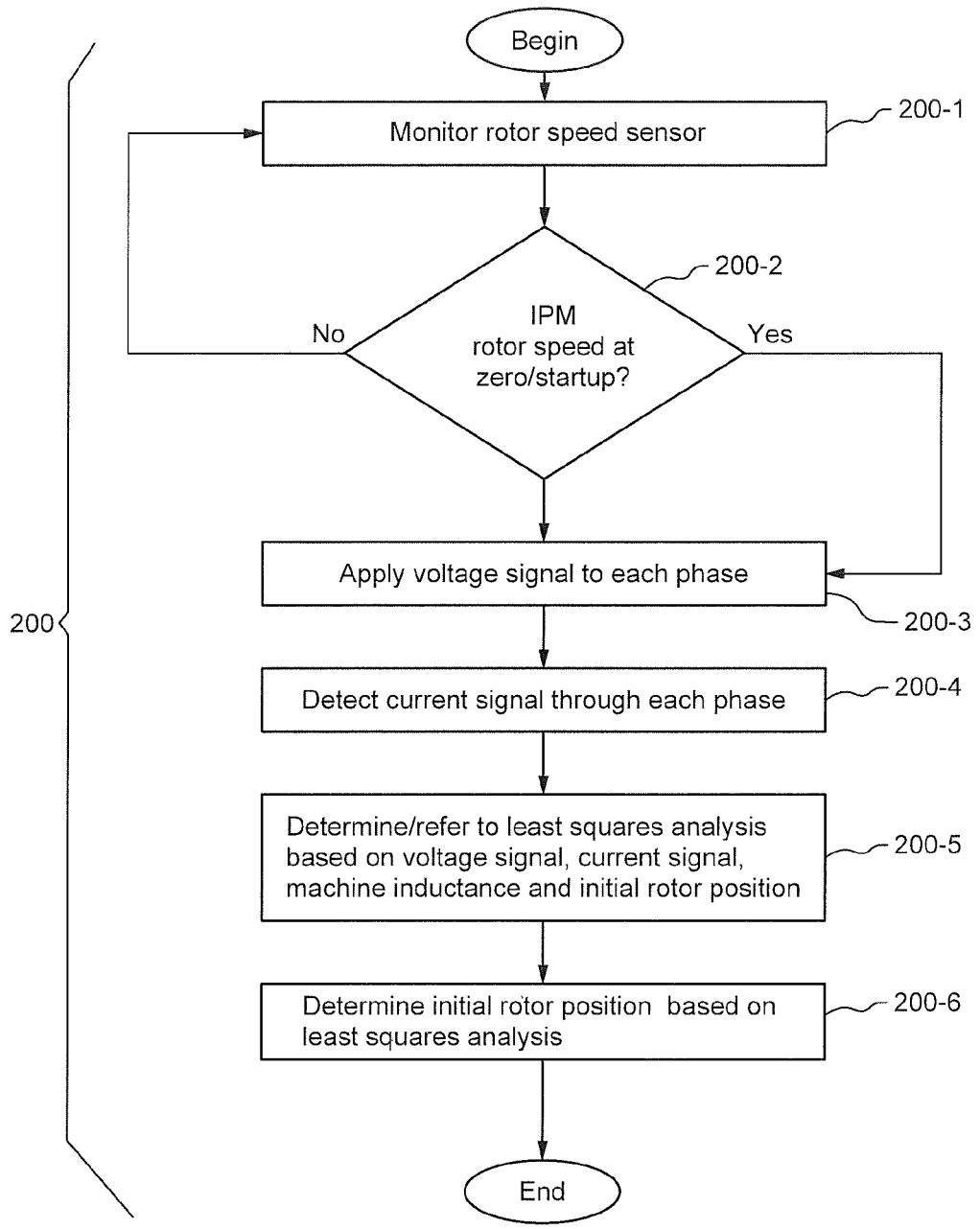
FIG. 4 is a flow diagram of one exemplary method of determining initial rotor position of an IPM machine.

Referring now to FIG. 4, an exemplary algorithm or method 200 of determining the initial position of a rotor 110 is provided with a plurality of steps that may be selectively performed by the controller 104, for example, during startup of the associated electric drive system 100. In an initial step 200-1, the controller 104 may be configured to receive a sensor signal from the speed sensor 116 indicative of the speed of the rotor 110 relative to the stator 108. Based on the sensor signal, the controller 104 in step 200-2 may be configured to determine whether the IPM machine 102 is at stand-still or at rest, for instance, during startup of the associated electric drive system 100 and prior to actual operation of the IPM machine 102. If the rotor speed is not zero and the IPM machine 102 is determined to be operating, the controller 104 may continue monitoring the sensor signal for a stand-still state. Alternatively, if the rotor 110 is determined to be at rest relative to the stator 108, the controller 104 in step 200-3 may be configured to apply a voltage signal to each phase 118 of the stator 108.

Figure 5:
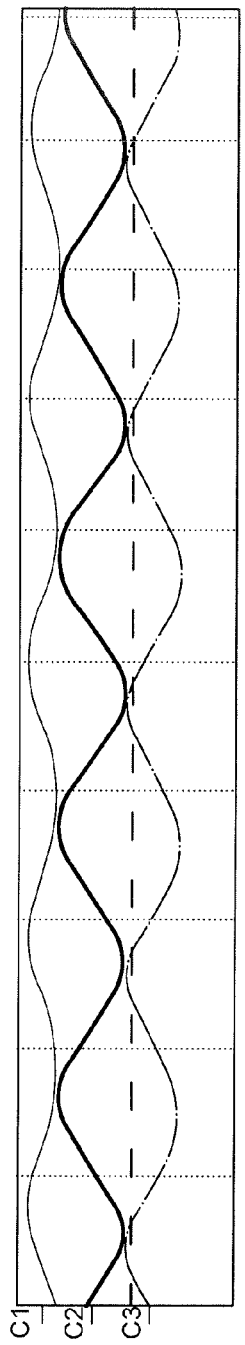
FIG. 5 is a graphical view of the phase current through each phase of an IPM machine.

As shown in FIG. 5, for example, the controller 104 may be preprogrammed to control the switches 122 of the drive circuit 106 such that the drive circuit 106 applies a continuous voltage waveform, such as a sinusoidal voltage signal, to each phase 118 of the stator 108. Each voltage signal may be offset from one another by the appropriate phase. Each voltage signal may additionally be provided with a relatively or a substantially low amplitude that is sufficient to induce a responsive current through each phase 118, but low enough so as not to cause any movement of the rotor 110. As shown in FIG. 5, for example, each voltage signal may be provided with a peak-to-peak voltage within the range of approximately 500-600 mV. Furthermore, each voltage signal may correspondingly be provided with a relatively or a substantially high frequency, for example, approximately 240 Hz.

Figure 6:
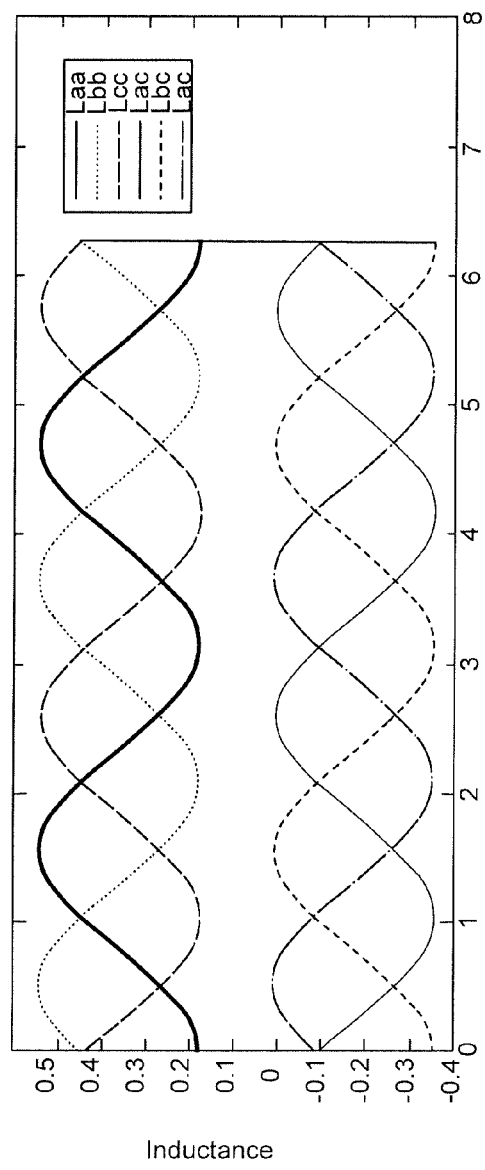
FIG. 6 is a graphical view of the machine inductance of an IPM machine.

Referring back to FIG. 4, the controller 104 in step 200-4 may further be configured to detect the current that is generated through each phase 118 of the stator 108 in response to the voltage signals applied during step 200-3. More specifically, the controller 104 may observe at least the amplitude and phase of each current signal associated with the stator 108. Based at least partially on the voltage signals and the current signals, the controller 104 may further be able to determine the initial rotor position by reference to a least squares analysis in step 200-5. While a least squares analysis may employ any one or more of a variety of other relevant parameters of the IPM machine 102 to assess the initial rotor position, the least squares analysis of step 200-5 may generally employ the amplitude and phase of the voltage signal for each phase 118, the amplitude and phase of the current signal for each phase 118, a predefined inductance of the IPM machine 102, and the like. Additionally, the inductance of the IPM machine 102 may incorporate the self-inductance and the mutual inductance exhibited by the IPM machine 102, as shown in FIG. 6 for example.

In one exemplary implementation, the least squares analysis may begin with the expression $$L = \begin{pmatrix} \Sigma - \Delta\cos(2\theta) & -\Sigma/2 - \Delta\cos(2\theta - 2\pi/3) & -\Sigma/2 - \Delta\cos(2\theta + 2\pi/3) \\ -\Sigma/2 - \Delta\cos(2\theta - 2\pi/3) & \Sigma - \Delta\cos(2\theta + 2\pi/3) & -\Sigma/2 - \Delta\cos(2\theta) \\ -\Sigma/2 - \Delta\cos(2\theta + 2\pi/3) & \Sigma/2 - \Delta\cos(2\theta) & \Sigma - \Delta\cos(2\theta - 2\pi/3) \end{pmatrix} \quad (1)$$

where L is the inductance matrix for the IPM machine 102, $\Sigma=(L_q+L_d)/3$ and $\Delta=(L_q-L_d)/3$. At stand-still, the expression for the voltage of the IPM machine 102 may be provided by $$\begin{pmatrix} v_a \\ v_b \\ v_c \end{pmatrix} = R \begin{pmatrix} i_a \\ i_b \\ i_c \end{pmatrix} + L \frac{d}{dt} \begin{pmatrix} i_a \\ i_b \\ i_c \end{pmatrix} \quad (2)$$

which in the phasor domain may be provided by $$\begin{pmatrix} V_a \\ V_b \\ V_c \end{pmatrix} = R \begin{pmatrix} I_a \\ I_b \\ I_c \end{pmatrix} + j\omega L \begin{pmatrix} I_a \\ I_b \\ I_c \end{pmatrix} \qquad (3)$$

Based on relationships (1)-(3), machine inductance L may be provided by the expression $$L = \begin{pmatrix} \Sigma & -\Sigma/2 & -\Sigma/2 \\ -\Sigma/2 & \Sigma & -\Sigma/2 \\ -\Sigma/2 & -\Sigma/2 & \Sigma \end{pmatrix} - \cos(2\theta) \begin{pmatrix} \Delta & -\Delta/2 & -\Delta/2 \\ -\Delta/2 & \Delta & -\Delta/2 \\ -\Delta/2 & -\Delta/2 & \Delta \end{pmatrix} - \qquad (4)$$

$$\sin(2\theta) \begin{pmatrix} 0 & \Delta\sqrt{3}/2 & -\Delta\sqrt{3}/2 \\ \Delta\sqrt{3}/2 & -\Delta\sqrt{3}/2 & 0 \\ -\Delta\sqrt{3}/2 & 0 & \Delta\sqrt{3}/2 \end{pmatrix}$$

For purposes of determining the initial rotor position, $h_1$, $h_2$ and $h_3$ may be defined as $$h_1 = \begin{pmatrix} \Sigma & -\Sigma/2 & -\Sigma/2 \\ -\Sigma/2 & \Sigma & -\Sigma/2 \\ -\Sigma/2 & -\Sigma/2 & \Sigma \end{pmatrix} \begin{pmatrix} I_a \\ I_b \\ I_c \end{pmatrix} \qquad (5)$$

$$h_2 = -\begin{pmatrix} \Delta & -\Delta/2 & -\Delta/2 \\ -\Delta/2 & \Delta & -\Delta/2 \\ -\Delta/2 & -\Delta/2 & \Delta \end{pmatrix} \begin{pmatrix} I_a \\ I_b \\ I_c \end{pmatrix} \qquad (6)$$

$$h_3 = -\begin{pmatrix} 0 & \Delta\sqrt{3}/2 & -\Delta\sqrt{3}/2 \\ \Delta\sqrt{3}/2 & -\Delta\sqrt{3}/2 & 0 \\ -\Delta\sqrt{3}/2 & 0 & \Delta\sqrt{3}/2 \end{pmatrix} \begin{pmatrix} I_a \\ I_b \\ I_c \end{pmatrix} \qquad (7)$$

Based on definitions (5)-(6), the phasor domain expression for voltage defined above in relationship (3) may be rewritten as $$\begin{pmatrix} V_a \\ V_b \\ V_c \end{pmatrix} = R \begin{pmatrix} I_a \\ I_b \\ I_c \end{pmatrix} + j\omega h_1 + j\omega h_2 \cos(2\theta) + j\omega h_3 \sin(2\theta) \qquad (8)$$

or equivalently as $$\frac{1}{j\omega}\begin{pmatrix} V_a \\ V_b \\ V_c \end{pmatrix} - \frac{R}{j\omega}\begin{pmatrix} I_a \\ I_b \\ I_c \end{pmatrix} - h_1 = \frac{(h_2 h_3)}{H}\begin{pmatrix} \cos(2\theta) \\ \sin(2\theta) \end{pmatrix} \qquad (9)$$

Furthermore, based on relationship (9), the initial rotor position at stand-still may be calculated according to $$\begin{pmatrix} \cos(2\theta) \\ \sin(2\theta) \end{pmatrix} = (H^H H)^{-1} H^H \left[ \frac{1}{j\omega}\begin{pmatrix} V_a \\ V_b \\ V_c \end{pmatrix} - \frac{R}{j\omega}\begin{pmatrix} I_a \\ I_b \\ I_c \end{pmatrix} - h_1 \right] \qquad (10)$$

Correspondingly, during step 200-6 of the method 200 of FIG. 5, the controller 104 may be configured to determine or refer to the least squares analysis, or at least one or more relationships thereof, that may be preprogrammed within a memory of the controller 104 or otherwise accessible to the controller 104. For example, by applying the relevant voltage signal parameters and current signal parameters into relationship (10) above, the controller 104 may be able to determine the angular position of the rotor 110 relative to the stator 108 of the IPM machine 102 at stand-still, while at rest, during startup, or otherwise prior to actual operation thereof. The controller 104 may be preprogrammed with relationship (10) and/or preprogrammed with predefined rotor position values that have been mapped with known ranges of voltage and current signals, for example, according to relationship (10).

The algorithm or method 200 of FIG. 5 may be incorporated or preprogrammed as a sub-algorithm or sub-routine into an existing controller of the associated electric drive system 100 to be automatically performed at each startup or prior to actual operation of the IPM machine 102. In other modifications, the method 200 may be preprogrammed to be automatically executed when the IPM machine 102 is determined to be at rest and when one or more predefined operating conditions of the associated electric drive system 100 are satisfied. In still further modifications, the method 200 may be preprogrammed to be manually engageable on demand by an operator of the IPM machine 102 and/or electric drive system 100.

INDUSTRIAL APPLICABILITY

In general, the foregoing disclosure finds utility in various applications relating to the control of permanent magnet machines and motors. More specifically, the disclosed systems and methods may be used to provide more efficient control of interior permanent magnet (IPM) machines that are typically used in association with electric drive systems including machine tools, traction motors, industrial work machines, stationary drive machines, mobile work vehicles, hybrid electric vehicles, and the like. Furthermore, the disclosed initial rotor position detection systems and methods may be incorporated into controllers of existing machine assemblies to provide more accurate detection of the initial rotor position. Still further, the present disclosure may be configured to automatically execute during startup, at stand-still and prior to actual operation of the IPM machine to improve efficiency and provide increased responsiveness of the IPM machine.

From the foregoing, it will be appreciated that while only certain embodiments have been set forth for the purposes of illustration, alternatives and modifications will be apparent from the above description to those skilled in the art. These and other alternatives are considered equivalents and within the spirit and scope of this disclosure and the appended claims.

What is claimed is:

1. A system for determining an initial rotor position of an interior permanent magnet (IPM) machine having a rotor and a stator, the system comprising:
    a drive circuit in operative and electrical communication with each phase of the IPM machine; and
    a controller in electrical communication with the drive circuit, the controller configured to engage the drive circuit to selectively apply a voltage signal to each phase of the stator of the IPM machine, detect a current signal through each phase corresponding to the applied voltage signal, and calculate the initial rotor position based on a least squares analysis between at least the voltage signal, the current signal and a predefined inductance of the IPM machine including both self-inductance and mutual inductance associated with the IPM machine, the controller configured to calculate the initial rotor position based at least partially on the following equation:

$$\begin{pmatrix}\cos 2\theta \\ \sin 2\theta\end{pmatrix} = (H^H H)^{-1} H^H \left[ \frac{1}{j\omega}\begin{pmatrix}V_a \\ V_b \\ V_c\end{pmatrix} - \frac{R}{j\omega}\begin{pmatrix}I_a \\ I_b \\ I_c\end{pmatrix} - h_1 \right].$$

2. The system of claim 1, wherein the controller and the drive circuit is configured such that the voltage signal applied to each phase of the IPM machine has a substantially high frequency and a substantially low amplitude.

3. The system of claim 2, wherein the frequency of the voltage signal is approximately 240 Hz.

4. The system of claim 1, wherein the stator of the IPM machine includes three phases.

5. The system of claim 1, wherein the controller is further configured to monitor a rotor speed sensor configured to detect a rotor speed of the rotor relative to the stator of the IPM machine.

6. The system of claim 5, wherein the controller is configured to engage the drive circuit to apply the voltage signal only when the detected rotor speed of the IPM machine is confirmed to be zero.

7. The system of claim 1, wherein the controller is configured to automatically calculate the initial rotor position at startup of the IPM machine.

8. The system of claim 1, wherein the controller incorporates the amplitude and phase of each voltage signal for each phase, and the amplitude and phase of each current signal for each phase into the least squares analysis.

9. The system of claim 1, wherein the controller is preprogrammed with predefined rotor position values that have been mapped with known ranges of voltage and current signals.

10. The system of claim 1, wherein the controller is configured to automatically calculate the initial rotor position when the IPM machine is determined to be at rest.

11. The system of claim 1, wherein the controller is configured to automatically calculate the initial rotor position when a predefined operating condition of an associated electric drive system is satisfied.

12. A method of determining an initial rotor position of an interior permanent magnet (IPM) machine having a rotor and a stator, the method comprising the steps of:
applying a voltage signal to each phase of the stator of the IPM machine;
determining a current signal through each phase corresponding to the applied voltage; and
calculating the initial rotor position based on a least squares analysis between at least an amplitude and a phase of each voltage signal, an amplitude and a phase of each current signal, and a predefined inductance of the IPM machine including at least a self-inductance value and a mutual inductance value associated with the IPM machine, the least squares analysis including the following equation:

$$\begin{pmatrix}\cos 2\theta \\ \sin 2\theta\end{pmatrix} = (H^H H)^{-1} H^H \left[ \frac{1}{j\omega}\begin{pmatrix}V_a \\ V_b \\ V_c\end{pmatrix} - \frac{R}{j\omega}\begin{pmatrix}I_a \\ I_b \\ I_c\end{pmatrix} - h_1 \right].$$

13. The method of claim 12, wherein the controller and the drive circuit is configured such that the voltage signal applied to each phase of the IPM machine has a substantially high frequency and a substantially low amplitude.

14. The method of claim 13, wherein the frequency of the voltage signal is approximately 240 Hz.

15. The method of claim 12, wherein the IPM machine includes three phases.

16. The method of claim 12, further comprising the step of monitoring a rotor speed sensor configured to detect a speed of the rotor relative to the stator of the IPM machine.

17. The method of claim 16, wherein the voltage signal is applied only when the detected rotor speed of the IPM machine is confirmed to be zero.

18. The method of claim 12, wherein the initial rotor position is automatically calculated at startup of the IPM machine.

19. The method of claim 12, wherein the initial rotor position is further based at least partially on a predefined inductance of the IPM machine.

20. A method of automatically determining an initial rotor position during startup of an interior permanent magnet (IPM) machine having a rotor and a stator, the method comprising the steps of:
receiving a sensor signal from a rotor speed sensor indicative of a speed of the rotor relative to the stator to confirm zero rotor speed;
applying a sinusoidal voltage signal to each phase of the stator of the IPM machine, each voltage signal having a substantially high frequency and a substantially low amplitude;
detecting a current signal through each phase corresponding to the applied voltage signal;
determining a relationship between the voltage signal, the current signal and the initial rotor position based on a least squares analysis and a predefined inductance of the IPM machine including at least a self-inductance value and a mutual inductance value associated with the IPM machine, the least squares analysis including the following equation:

$$\begin{pmatrix}\cos 2\theta \\ \sin 2\theta\end{pmatrix} = (H^H H)^{-1} H^H \left[ \frac{1}{j\omega}\begin{pmatrix}V_a \\ V_b \\ V_c\end{pmatrix} - \frac{R}{j\omega}\begin{pmatrix}I_a \\ I_b \\ I_c\end{pmatrix} - h_1 \right]; \text{ and}$$

and
calculating the initial rotor position based on the relationship.

* * * * *